SINGLE SIDEBAND COMMUNICATION SYSTEM

Filed Nov. 12, 1957

Inventor
IRVING A. KRAUSE
By Philip M. Bolton
Attorney

United States Patent Office 2,938,114
Patented May 24, 1960

2,938,114

SINGLE SIDEBAND COMMUNICATION SYSTEM

Irving A. Krause, Nutley, N.J., assignor to International Telephone and Telegraph Corporation, Nutley, N.J., a corporation of Maryland Filed Nov. 12, 1957, Ser. No. 695,722

6 Claims. (Cl. 250—20)

Figure 1:
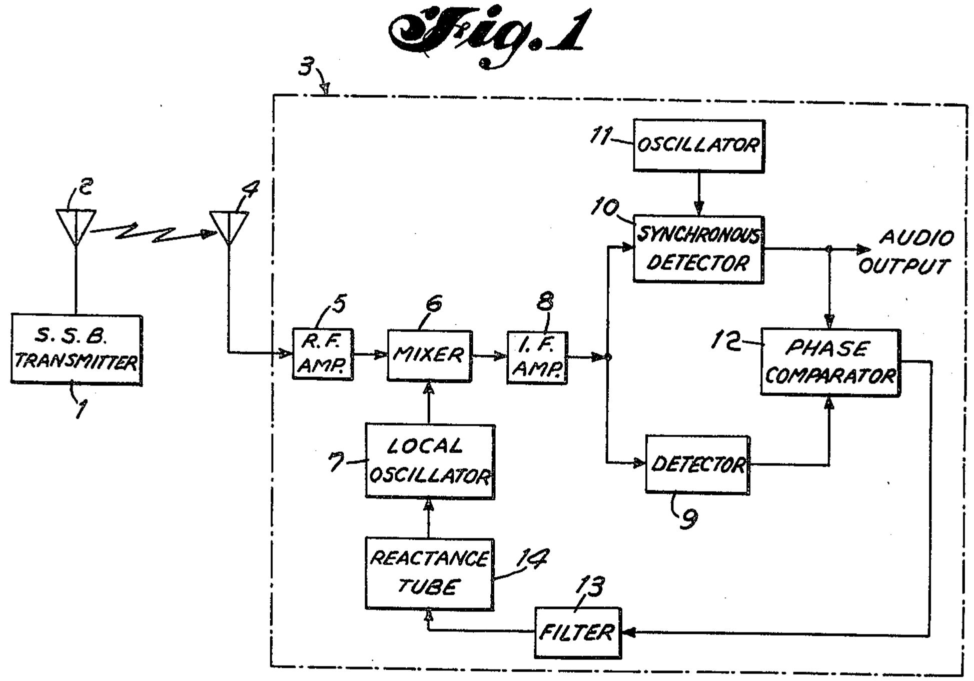

This invention relates to radio communication systems and more particularly to transmission and reception of the single sideband suppressed carrier type.

An object of the invention is to provide an improved system for the transmission and reception of single sideband suppressed carrier signals.

Another object is to provide means for automatic tuning of a superheterodyne receiver, so that a fixed oscillator will properly cause demodulation of a single sideband signal thereby cancelling the effects of frequency drift in transmitter and receiver.

Still another object is to provide an improved method for the insertion of the correct carrier in a single sideband suppressed carrier receiver.

A feature of this invention is that in a single sideband suppressed carrier system, the envelope of the single sideband signals to be transmitted and received is used as a reference to control the frequency of a variable oscillator of the single sideband receiver.

Another feature is that the receiver comprises a first detecting means to detect the envelope from the single sideband suppressed carrier signals bearing intelligence modulation which includes fundamental and harmonic frequency components, and a synchronous detector to derive from the signals the intelligence modulation components. A variable oscillator and other means coupled to the synchronous detector control the frequencies corresponding to the modulation components produced at the output of the synchronous detector and means responsive to the outputs of the first detecting means and the synchronous detector correct the frequency of the variable oscillaor to a fixed relation to the frequency of the suppressed carrier of the single sideband suppressed carrier signals. Under these conditions the waveform from the first detector and that from the synchronous detector will bear a fixed phase relationship.

Another feature is that the receiver is of the superheterodyne type and contains detecting means to detect the envelope of the single sideband signal and a synchronous detector and fixed oscillator in combination therewith to demodulate the single sideband signal. The receiver contains a variable local oscillator which determines the intermediate frequency of the single sideband receiver and thereby controls the frequencies of the demodulation products obtained at the output of the synchronous detector. The receiver contains means responsive to the output of the envelope detector and to the output of the synchronous detector to correct the variable local oscillator frequency such that the suppressed intermediate frequency carrier is in fixed relation to the frequency of the suppressed radio frequency carrier of the received signal and is equal to the frequency of the fixed oscillator at the synchronous detector. Under these conditions the waveform obtained from the envelope detector will bear a fixed phase relation to the demodulation waveform obtained from the synchronous detector.

Figure 2:
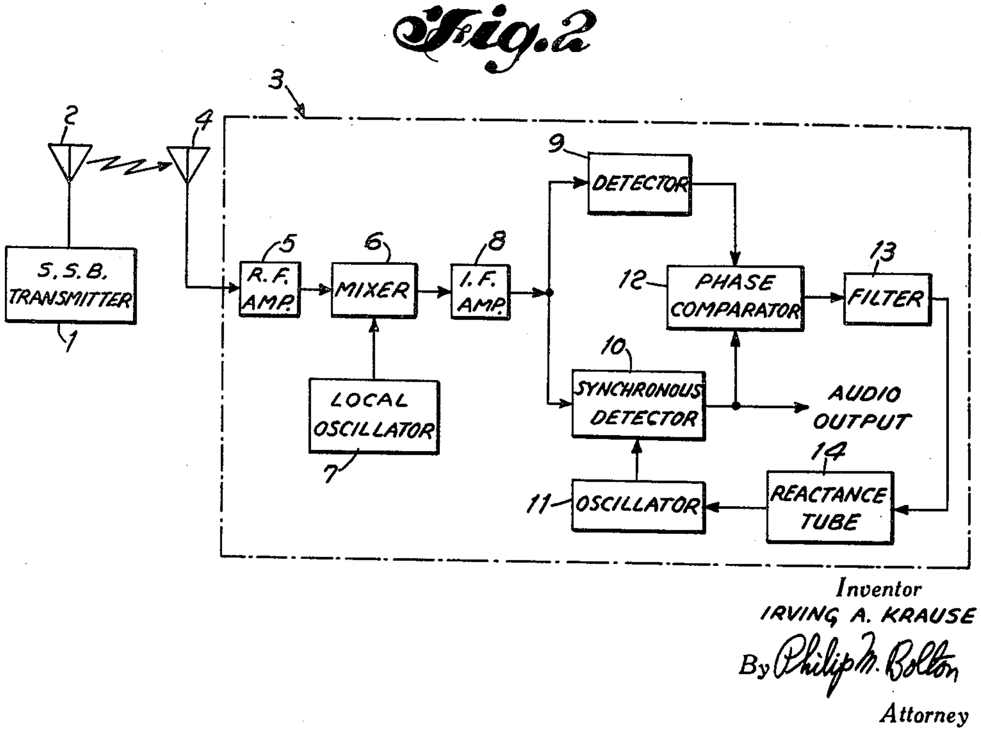

The above-mentioned and other features and objects of this invention and the manner of attaining them will become more apparent by reference to the following description taken in conjunction with the accompanying drawings, in which:

Fig. 1 is a block diagram of a single sideband suppressed carrier communication system of this invention; and Fig. 2 is a block diagram of a second embodiment of this invention.

As is well known, carrier communication by the single sideband method can be effected either by transmitting the carrier and one modulation sideband, or by suppressing the carrier and transmitting only the sideband modulations. Since one of the advantages in single sideband transmission is the improvement in signal-to-noise ratio, by reason of the relative concentration of the power in the sideband as compared with that in the carrier per se, even when a residual carrier is transmitted, its power may be insufficient to provide a reliable control of the carrier demodulation at the receiver. In other words, the carrier may be lost in the noise level, so that ordinary automatic carrier frequency control for the insertion oscillator at the receiver may fail. If, on the other hand, a large amount of pilot carrier is employed at the transmitter, then the advantage of single sideband is to a great extent lost.

In the carrier-suppressed single sideband receiver it is necessary, in order to derive the demodulated signals with satisfactory intelligibility and readability, to insert at the receiver a demodulation carrier of the same frequency or of a precisely related frequency to that which is used for the carrier at the transmitter. While methods of generating local insertion demodulation carriers at the receiving end are well known, there has arisen a need for the generation of such a carrier in a carrier-suppression system, the frequency of which insertion carrier is controlled by the received signals as distinguished from control by a local and separate frequency reference standard, such as a precision oscillator and the like.

Since the radio frequency envelope of a single sideband representation of a complex wave, such as speech, contains the fundamental component of the complex wave, the radio frequency or intermediate frequency envelope can be used to accurately locate the carrier frequency which has been suppressed. In order to demodulate the single sideband properly, it is required that the carrier frequency be introduced at the detector. Below 30 mc. the present receiving technique involves injection of an oscillator signal which is adjusted for proper demodulation of the received signal. The frequency stability of the transmitter and receiver are relied upon for demodulation to take place without continuous adjustment of the receiver oscillator frequency. At higher frequencies where the frequency stability requirements become more rigorous, the single sideband signal becomes more difficult to demodulate.

In accordance with this invention, the envelope of the received signals detected by a non-linear detector is phase compared with the intelligence modulation components of the signals that are derived from a synchronous detector to produce a carrier which can be used directly as the insertion carrier in a demodulation stage of a conventional single sideband receiver; or it can be used to produce an automatic frequency control for a local oscillator used in the receiver to produce the correct intermediate frequency, so that a fixed carrier insertion oscillator will effect proper demodulation of the signal.

Since each speech signal is a complex wave, it always consists of a fundamental frequency and harmonics of that frequency. In other words, the difference between any two adjacent harmonics is the same as the fundamental frequency itself. During speech, the fundamental varies or moves around, but whatever frequency the fundamental assumes, the above-noted difference relation between adjacent harmonics is always equal to the fundamental. For example, the fundamental may be 1000 c.p.s. with adjacent harmonics also differing by 1000 c.p.s. Since the received single sideband signal consists of the original audio frequency modulations displaced from an audio frequency range to the radio frequency range, or to the intermediate frequency range in the case of a superheterodyne receiver, the adjacent radio frequency or intermediate frequency components will still be separated from each other by the original fundamental frequency of the speech signals, for example, 1000 c.p.s. Thus if the speech modulated single sideband signal is passed through a detector or other well-known non-linear device, the output thereof will contain sum and difference products in the radio frequency or intermediate frequency ranges. The sum products may be discarded or filtered out, but the difference products will contain the fundamental audio component amongst other frequency products. If the same speech modulated single sideband signal is passed through a synchronous detector to which is coupled a demodulation oscillator, the output of which has the frequency equal to the carrier frequency of the input signal to the synchronous detector, then the output of the synchronous detector will be the same fundamental component and the harmonic thereof if the oscillator is correct in frequency. If the frequency of the demodulation oscillator is incorrect, then the output of the synchronous detector will not be the fundamental but the fundamental shifted by the number of cycles that the oscillator is in error. When the output of the synchronous detector is phase compared with the output of the non-linear detector, if there is a frequency difference, the error voltage so produced can be used to correct the frequency of the local oscillator.

As one particular illustration, let it be assumed that the speech signal at any given instant consists of the fundamental 1000 c.p.s. and the second harmonic thereof 2000 c.p.s., which signal is impressed on an intermediate frequency carrier of 500,000 c.p.s. If the lower sideband is discarded and only the upper sideband used, then the input to the non-linear detector will be 501,000 c.p.s. signal and 502,000 c.p.s. signal. The output of the non-linear detector will be 1000 c.p.s. and 1,003,000 c.p.s. of which only 1000 c.p.s. is passed by the time constant of the detector. The output of the synchronous detector to which the same signal is fed and with the correctly assumed oscillator frequency of 500,000 c.p.s. will be the original audio signal, that is, 1000 c.p.s. and 2000 c.p.s., the sum frequencies being filtered out in the synchronous detector time constant.

Referring to Fig. 1, there is shown a typical single sideband suppressed carrier communication system embodying the invention. The single sideband transmitter 1 is coupled to an antenna 2, the carrier frequency of which may be any RF frequency. In such a system the single sideband, for example, the upper sideband transmission is received in any well-known single sideband radio receiver 3, which receives signals from a receiving antenna 4 coupled to a radio frequency amplifier 5. The output of amplifier 5 is coupled to a mixer 6, to which is also coupled a local oscillator 7, to convert the received single sideband signal to a lower or intermediate frequency range, as is well known in the superheterodyne receiver art. This intermediate frequency single sideband signal is amplified in a suitable intermediate frequency amplifier 8, the output of which is fed to a non-linear detector 9 and to a synchronous detector 10 to which is coupled the output of a demodulation oscillator 11. The outputs of the synchronous detector 10 and the non-linear detector 9 are fed into a phase comparator 12, which is coupled to a filter 13. The output of the filter 13 is coupled to a reactance tube 14, which is coupled to the local oscillator 7. The audio output of the system is taken from the synchronous detector.

In accordance with the invention, the correct frequency for supplying the local oscillator 7 carrier to the mixer 6 is derived under control of the received single sideband signal itself, even though that signal may have the carrier suppressed or of insufficient level to be used as a reliable source of control of said frequency. Merely for purposes of illustration let it be assumed that the superheterodyne receiver is arranged to produce at the output of the mixer 6 an intermediate frequency of 500,000 c.p.s. and that the audio frequency modulation signal has a fundamental frequency of 1000 c.p.s. with a first harmonic of 2000 c.p.s., and let it be assumed that the amplifier 8 is arranged to pass only the upper sideband. The output of the amplifier 8 will then consist of 501,000 c.p.s. plus 502,000 c.p.s. Then a portion of the output of amplifier 8 is applied to the non-linear detector 9, which produces at its output 1000 c.p.s. and 1,003,000 c.p.s. of which only 1000 c.p.s. is passed by the time constant of the detector. A portion of the amplifier 8 is passed also to the synchronous detector 10, the output of which with the frequency of the oscillator 11 at 500,000 c.p.s. will be the original audio signals 1000 c.p.s. and 2000 c.p.s., the sum frequencies being filtered out in the synchronous detector time constant. When the outputs of the detector 9 and the synchronous detector 10 are compared in the phase comparator 12, it is apparent that no error voltage will develop since the fundamental frequency component of 1000 c.p.s., the output of the detector 9, is equal in frequency and phase to the intelligence modulation component output of the synchronous detector 10, thus indicating that the local oscillator 7 frequency has the correct fixed relation to the suppressed carrier of the single sideband suppressed carrier signal. Let us assume that the output frequency of the mixer 6 is 500,001 c.p.s., due to the local oscillator 7 frequency being incorrect to the extent of 1 c.p.s., then the output of the amplifier 8 will be 501,001 and 502,001. The non-linear detector 9 will detect the fundamental frequency component of 1000 c.p.s. from the modulation envelope. The output of the synchronous detector 10 will be 1001 and 2001 c.p.s. When the outputs of the detector 9 and the synchronous detector 10 are compared in the phase comparator, an error voltage will be obtained which, when filtered by filter 13 to remove the audio components and applied to the reactance tube 14, will cause the oscillator frequency to change to the correct frequency, and the frequency of the suppressed carrier of the intermediate frequency signal will be changed to 500,000 c.p.s.

While in the foregoing there has been described a system wherein the frequency of the local oscillator 7 has been corrected to the fixed relation with the suppressed carrier, the embodiment of Fig. 2 may be used to accomplish the object of this invention. In this case the frequency of the local oscillator 7 is not controlled. The output of the IF amplifier 8 is fed to both a non-linear detector 9 and a synchronous detector 10 as before. The outputs of the detector 9 and the synchronous detector 10 are compared in the phase comparator 12, and the resulting error voltage is passed on to the filter 13 where the audio components are filtered out and the sub-audio control voltages are then applied to the reactance tube 14, which in combination with the demodulation oscillator 11 will cause the oscillator 11 to frequency and phase lock to the suppressed carrier. Let us assume that the input to the detector 9 and the synchronous detector 10 is 501,000 c.p.s. and 502,000 c.p.s. Then, as before, the output of the non-linear detector 9 will be 1000 c.p.s. and the output of the synchronous detector 10 will be 1000 c.p.s. and 2000 c.p.s., which indicates that the demodulation oscillator 11 is generating the correct frequency of 500,000 c.p.s. If the demodulating oscillator 11 deviates from the correct frequency by, for example, 1 c.p.s., then the output of the synchronous detector 10 will be 1001 and 2001 c.p.s. When compared with the output of the detector 9, an error voltage will develop which, when applied to the reactance tube, will cause the frequency of the oscillator 11 to shift to the correct frequency.

In all of the foregoing it has been assumed, for illustrative purposes only, that the upper sideband is the only single sideband utilized. It is obvious that in this system either the upper or the lower sidebands may be used, and the usual techniques, well-known to those skilled in the art, can be employed to switch from one sideband to the other as the reception of the signal may require. Among the possible methods of sideband switching that may be employed are two IF channels, one for the upper sideband and the other for the lower sideband, in which case the carrier does not have to move.

It is to be understood that this invention is not limited to voice transmission but may be used wherever there is complex periodic wave transmission, such as in facsimile, single sideband television, and so forth.

While various frequency values have been referred to herein, it will be understood that the same has been done merely for the purpose of explanation and not by way of limitation thereto, the essential feature being that in all disclosed embodiments the intelligence modulation frequency signals can be detected and reproduced from the received suppressed carrier single sideband transmission by using the envelope of the single sideband signals to control the frequency of a variable oscillator to a fixed relation to the frequency of the suppressed carrier.

While I have described above the principles of my invention in connection with specific apparatus, it is to be clearly understood that this description is made only by way of example and not as a limitation to the scope of my invention as set forth in the objects thereof and in the accompanying claims.

I claim:

1. A single sideband suppressed carrier communication system comprising means to receive transmitted single sideband suppressed carrier signals bearing intelligence modulation having fundamental and harmonic frequency components, a mixer, a first oscillator coupled to said mixer, an intermediate frequency amplifier coupled to the output of said mixer, a first detecting means to detect from said signals the envelope of said signals, a synchronous detector means to derive from said signals the intelligence modulation components, a second oscillator coupled to said synchronous detector, and means responsive to the output of said first detecting means and said synchronous detector to correct the frequency of one of said oscillators to a fixed relation with respect to the frequency of the suppressed carrier of said single sideband suppressed carrier signal.

2. A single sideband suppressed carrier communication system according to claim 1 wherein said means responsive to the outputs of said first detecting means and said synchronous detector means include phase comparison means to compare the outputs of said first detecting means and said synchronous detector means to derive therefrom an error voltage when said intelligence modulation components differ in phase from said envelope, and means to apply said error voltage to correct the frequency of said variable oscillator to a fixed relation with respect to the frequency of the suppressed carrier of said single sideband suppressed carrier signal.

3. A single sideband suppressed carrier communication system comprising means to receive transmitted single sideband suppressed carrier signals bearing intelligence modulation having fundamental and harmonic frequency components, a mixer, a local oscillator, means coupling said received signals and said local oscillator to said mixer, an intermediate frequency amplifier coupled to the output of said mixer, a first detecting means coupled to said IF amplifier to detect from said signals the envelope of said signals, a synchronous detector means likewise coupled to said IF amplifier to derive from said signals the intelligence modulation components, and means responsive to the outputs of said first detecting means and said synchronous detector to correct the frequency of said local oscillator to a fixed relation with respect to the frequency of the suppressed carrier of said single sideband suppressed carrier signal.

4. A single sideband suppressed carrier communication system comprising means to receive transmitted single sideband suppressed carrier signals bearing intelligence modulation having fundamental and harmonic frequency components, a first detecting means to detect from said signals the envelope of said signals, a synchronous detector means to derive from said signals the intelligence modulation components, a demodulation oscillator directly coupled to said synchronous detector, and means responsive to the outputs of said first detecting means and said synchronous detector to correct the frequency of said demodulation oscillator to a fixed relation to the frequency of the suppressed carrier of said single sideband suppressed carrier signal.

5. In a single sideband radio receiving system, the combination of a single sideband radio receiver including means to receive a single sideband suppressed carrier signal bearing intelligence modulation having fundamental and harmonic frequency components, a local oscillator, means to mix said single sideband suppressed carrier signal with the output of said local oscillator to derive a single sideband suppressed carrier intermediate frequency signal, first detector means to detect from said intermediate frequency signal the envelope of said signal, synchronous detector means to derive from said intermediate frequency signal the intelligence modulation components, means to compare the phase of the outputs of said first detector means and said synchronous detector means to produce an error voltage when said intelligence modulation components differ in phase from said envelope, means to apply said error voltage to said local oscillator to generate a correct signal frequency which when mixed with the said single sideband suppressed carrier signal will result in said single sideband suppressed carrier intermediate frequency signal having a carrier frequency which bears a fixed relation with respect to the frequency of the suppressed carrier of said single sideband suppressed carrier signal.

6. In a single sideband ratio receiving system, the combination of a single sideband radio receiver including means to receive a single sideband suppressed carrier signal bearing intelligence modulatiton having characteristic fundamental and harmonic frequency components, a local oscillator, means to mix said single sideband suppressed carrier signal with the output of said local oscillator to derive a single sideband suppressed carrier intermediate frequency signal, first detecting means to detect from said intermediate frequency signal the envelope of said signal, synchronous detector means coupled to a demodulation oscillator to derive from said intermediate frequency signals the intelligence modulation components, means to compare the phase of the outputs of said first detecting means and said synchronous detected means to produce an error voltage when said intelligence modulation components differ in phase from said envelope, means to apply said error voltage to said demodulation oscillator to cause said demodulation oscillator to generate a demodulation carrier of a frequency substantially equal to the suppressed carrier of said intermediate frequency signal.

References Cited in the file of this patent

UNITED STATES PATENTS

| | | |
|---|---|---|
| 2,715,677 | Turner | Aug. 16, 1955 |
| 2,836,712 | Crosby | May 27, 1958 |